(12) United States Patent
Quiñones et al.

(10) Patent No.: US 7,170,390 B2
(45) Date of Patent: Jan. 30, 2007

(54) METHOD AND APPARATUS FOR CONDITIONING ACCESS FOR A REMOTELY-ACCESSIBLE DEVICE

(75) Inventors: Luis F. Quiñones, Weston, FL (US); Victor Maldonado, Miramar, FL (US)

(73) Assignee: Topp Group, Inc., Miami, FL (US)

( * ) Notice: Subject to any disclaimer, the term of this patent is extended or adjusted under 35 U.S.C. 154(b) by 108 days.

(21) Appl. No.: 10/368,496

(22) Filed: Feb. 18, 2003

(65) Prior Publication Data

US 2004/0162063 A1 Aug. 19, 2004

(51) Int. Cl.
*G05B 19/00* (2006.01)
*G06F 7/00* (2006.01)
*G06K 19/00* (2006.01)
*G08B 13/00* (2006.01)
*H04B 1/00* (2006.01)

(52) U.S. Cl. .................. 340/5.3; 340/5.42; 340/5.5

(58) Field of Classification Search ............. 340/5.3, 340/5.42, 5.5, 424.5, 825.28, 825.29, 988; 705/13, 6; 368/10, 21, 47
See application file for complete search history.

(56) References Cited

U.S. PATENT DOCUMENTS

| | | | | |
|---|---|---|---|---|
| 5,483,234 A | * | 1/1996 | Carreel et al. | 340/994 |
| 5,724,316 A | * | 3/1998 | Brunts | 368/10 |
| 5,887,269 A | * | 3/1999 | Brunts et al. | 701/208 |
| 5,952,958 A | * | 9/1999 | Speasl et al. | 342/357.08 |
| 6,363,323 B1 | * | 3/2002 | Jones | 701/213 |
| 6,496,777 B2 | * | 12/2002 | Tennison et al. | 701/213 |
| 6,717,527 B2 | * | 4/2004 | Simon | 340/825.36 |
| 6,778,834 B2 | * | 8/2004 | Laitinen et al. | 455/450 |

\* cited by examiner

*Primary Examiner*—Michael Horabik
*Assistant Examiner*—Nam Nguyen
(74) *Attorney, Agent, or Firm*—Saliwanchik, Lloyd & Saliwanchik (57) ABSTRACT

A method and apparatus for conditioning the access of a user of a remotely-accessible device, which tracks and monitors objects, by using a preprogrammed expiration time and date and comparing that to a reliable time and date source, such as a time and date received from a global positioning system receiver, and disabling the processing of signals of the remotely-accessible device if the time and date comparison reveals that the license, service, lease, rental or commodity agreement has expired.

32 Claims, 5 Drawing Sheets

METHOD AND APPARATUS FOR CONDITIONING ACCESS FOR A REMOTELY-ACCESSIBLE DEVICE

FIELD OF INVENTION

The present invention relates generally to a method and apparatus which conditions the access of a user of a remotely-accessible device by impairing the useful functionality of the device after the expiration of the user's rights to use the device, and more specifically which conditions the access of the user to the remotely-accessible device, by using a preprogrammed expiration time and date and comparing that to an actual time and date source, such as a time and date received from a global positioning system, and disabling the processing of signals of the device if the time and date comparison reveals that the user's license, service, lease, rental or commodity agreement has expired.

BACKGROUND OF THE INVENTION

This invention is directed to conditioning the access of an end user of a remotely-accessible device by impairing the useful functionality o service, lease, rental or commodity agreement has expired. The remotely-accessible device of the invention will be used by end users who desire to track, monitor and control an object or objects. The remotely-accessible device of the invention can be a tracking device or a monitoring device and is equally applicable in both the telematic and telemetry fields. Objects may be vehicles, equipment, meters, point of sale applications, or any other objects capable of being tracked or monitored. The remotely-accessible device of the invention may be a tracking device used to track or monitor vehicles for a stolen vehicle recovery system, to track, monitor and control a fleet of vehicles, to track, monitor or control leased or rented equipment, to operate or cease operation of leased or rented equipment, and to track, monitor, operate or cease operation of meters.

An object of this invention is to provide a solution to a problem in the remotely-accessible device service providers industry, where the en re-route the output signal from the tracking device to a new website when the user's agreement has expired, thus circumventing the service provider and failing to renew the agreement. Remotely-accessible device service providers are the companies that supply the devices to users or the companies that supply the tracking or monitoring service to users. Service providers customarily provide a report to the user, which supplies all the information the user desires to track. These reports can be received on paper, by telephone, pager, facsimile, or e-mail messages; however, the current trend is to publish these reports on the service provider's website. Website access allows users to almost instantaneously track and monitor their objects at a time that is convenient to them.

Some remotely-accessible devices are designed to be used for tracking and monitoring objects. Remotely-accessible devices are used to supply a plurality of information from the objects, such as location, status, degree of utilization, condition, communications, and speed. One way of transmitting this information from the transponder or remotely-accessible device, which is located on the object being tracked, is to transmit it to a website owned by the service provider. The user is then able to log on to the website with an access code or password and obtain the status report of his object(s). Under current technology, when the user's license, service, lease, rental or commodity agreement has expired, the user's password will no longer work on the website and the user loses access to the status report. At this point, some users will attempt to circumvent the service provider by redirecting the output signal from the remotely-accessible device or transponder to another website. This causes the service providers a great loss in fees, because they should be paid for use of their remotely-accessible devices and services.

For example, the process for relaying tracking information to the user as described in U.S. Pat. No. 6,292,724 to Apsell et al. ('724 patent) enables the transponders to send information to a satellite, which relays responses to a ground station and then via the internet to an information-processing-service-providing headquarters which processes the information and provides the information to users by the internet or otherwise. This system does not enable the tracking service provider to be able to prevent the user from circumventing the service provider by redirecting the output signal on the tracking device to an alternate website.

Consequently, there is a need in the art for a remotely-accessible device for which the output signal cannot be redirected to another website by unscrupulous users. This invention solves the problem by disabling the processing of signals at the remotely-accessible device upon the expiration of the user's right

SUMMARY OF THE INVENTION

The present invention solves significant problems in the art by providing a remotely-accessible device that embodies a processing module that compares the actual time and date obtained from a receiver with a preprogrammed expiration time and date, which represents the expiration of the user's rights to use the remotely-accessible device, and either authorizes or does not authorize the processing of signals of the device. If the preprogrammed expiration time and date occurs prior to the actual time and date, then the signals are not processed and the user can no longer access the tracking information. If the preprogrammed expiration time and date occurs after the actual time and date, then the signals continue to be processed and the remotely-accessible device remains functional.

The above and other objects of the invention are achieved in the embodiments described herein by a method for conditioning access to a remotely-accessible device. First, an actual time and date is determined based upon signals received at a receiver supplying reliable time and date information, which is preferably a global positioning system receiver. Next, the actual time and date is compared with the preprogrammed expiration time and date, which represents the expiration date of the user's license, service, lease, rental or commodity agreement. Finally, processing of the signals of the remotely-accessible device is disabled, if the actual time and date occurs after the preprogrammed expiration time and date.

Embodiments of the invention include the following features. The preprogrammed expiration time and date represents an expiration time and date of a license agreement for tracking and monitoring services, an expiration time and date of a lease or rental agreement for equipment, or an expiration time and date of an agreement whereby services, commodities or equipment are metered. The preprogrammed expiration time and date is programmed into the remotely-accessible device by a service provider using a command, a direct connection or an over-the-air transmission. The remotely-accessible device is set up to detect a plurality of parameters including location, speed, route adherence, communications, or revolutions per minute. The remotely-accessible device may be used to track or monitor vehicles for a stolen vehicle recovery system, to track or monitor a fleet of vehicles, to track or monitor leased or rented equipment, to operate or cease operation of leased or rented equipment, and to track, monitor, operate or cease operation of meters or other point of sale applications. The remotely-accessible device operates by using an internal logic that regularly monitors the preprogrammed expiration time and date and the validity of a signature and the actual time and date.

Generally described, the present invention provides a method of selectively disabling the processing of signals of a remotely-accessible device. The remotely-accessible device receives an actual time and date from a receiving device, which preferably is a global positioning system receiver. Next, the remotely-accessible device controls processing by authorizing or not authorizing operation of the device based upon the actual time and date. The remotely-accessible device performs the non-authorization step by disabling the processing of signals if the actual time and date does not occur prior to the preprogrammed expiration time and date. The remotely-accessible device performs the authorization step and continues the processing of signals if the actual time and date occurs prior to the preprogrammed expiration time and date.

In an alternate embodiment, there is provided a method for updating the preprogrammed expiration time and date in the conditioned access remotely-accessible device. This allows for a user to renew a license, service, lease, rental or commodity agreement, or other form of agreement, and not incur an interruption in remotely-accessible device services. The service provider will simply update the preprogrammed expiration time and date within the remotely-accessible device. The update is performed by the service provider, whereby they input the new expiration time and date along with an external signature code into the remotely-accessible device. This information may be input into the remotely-accessible device by a command, a direct connection or an over-the-air transmission. The external signature code is a code necessary to validate and therefore maintain the function of the device. The signature code contains the control information and the expiration time and date. The control information is made up of a unique seed loaded from the factory, along with other elements. The processing module in the remotely-accessible device then compares the new expiration time and date with the preprogrammed expiration time and date. If the new expiration time and date is greater then the preprogrammed expiration time and date, then the processing module creates an internal signature code. The processing module then compares the internal signature code with the external signature code input by the service provider. If the internal signature code and external signature code are the same, then the new expiration time and date and the signature code is saved. The preprogrammed expiration time and date is then reset to the new expiration time and date.

Accordingly, it is an object of the present invention to provide a remotely-accessible device embodying the methods above. This remotely-accessible device includes a wireless module, an application function, a receiver module, a processing module and an input/output signal module. The wireless module will provide for relatively inexpensive communications between the service provider and the remotely-accessible device. The wireless module can use a cellular network, satellite, or wireless internet services. The application function is an Event Driven Dynamic Interface Engine (EDDIE) that can control an object and generate reports using user input rules and actions. Before the user may input rules and actions, the user must enter a password. This application can be configured directly attached or over-the-air transmission. The user then configures the rules based upon several criteria, some of them being the tracked object's position, speed, time, signals, communications mode and status. The user then can configure actions that will be activated by an input/output signal module when the rules are met, such as, controlling signals or sending and logging messages. This application function enables the user to modify the tracking report or status to fit their specific tracking needs. Additionally, the remotely-accessible device will include a receiving module that will receive an actual time and date, preferably a global positioning system receiver. The processing module will compare the actual time and date received with a preprogrammed expiration time and date and impair its function if the actual time and date occurs after the preprogrammed time and date, by disabling the processing of signals by the remotely-accessible device.

An advantage of the invention is that the remotely-accessible device will disable the processing of signals upon expiration of the users right's to use the device and thereby the user is prevented from circumventing the service provider by redirecting the signal to another source or website.

DETAILED DESCRIPTION OF THE PREFERRED EMBODIMENT

This invention conditions the processing of signals of the remotely-accessible device upon the user having a non-expired agreement with the service provider to use the device. The remotely-accessible device has an integrated receiver within it to receive the actual time and date. This receiver is preferably a global positioning system receiver. The global positioning system comprises a series of satellites that was initially set up for use by the military to provide precise position information. Each global positioning system satellite maintains an extremely accurate clock. Thus, the remotely-accessible device uses the global positioning system satellites to determine the actual time and date and compare it with the expiration time and date of the agreement. The receiver can also be an automatic clock receiver, a digital television carrier receiver, or a U.S. Naval Observatory network time protocol (NTP) client receiver. The NTP is an internet standard protocol which enables client computers to maintain system time synchronization to the U.S. Naval Observatory master clocks in Washington, D.C. and Colorado Springs, Colo. After the actual time and date is compared with the expiration time and date of the agreement, if the agreement has expired, the processing of signals in the remotely-accessible device will be disabled, thus preventing use of the device and preventing the signals from being redirected. The processing of signals will also be disabled in the event that the signature code is compromised or the clock is compromised. Additionally, once the expiration date is exceeded, the signature is compromised, or the clock is compromised, the remotely-accessible device will significantly impair its normal operation, allowing only command level interface, direct connect or over-the-air transmission and access to the communications module. Upon excessive failed attempts to enter a new expiration time and date, the remotely-accessible device will self disable requiring factory authorized service as a measure to avoid attempts by users to guess the seed within the signature code. It should be understood that referring to "time and date" herein, as either the "actual time and date" or the "expiration time and date", should be interpreted to mean that this remotely-accessible device is able to compare and use time alone, the date alone or both time and date together.

Figure 1:
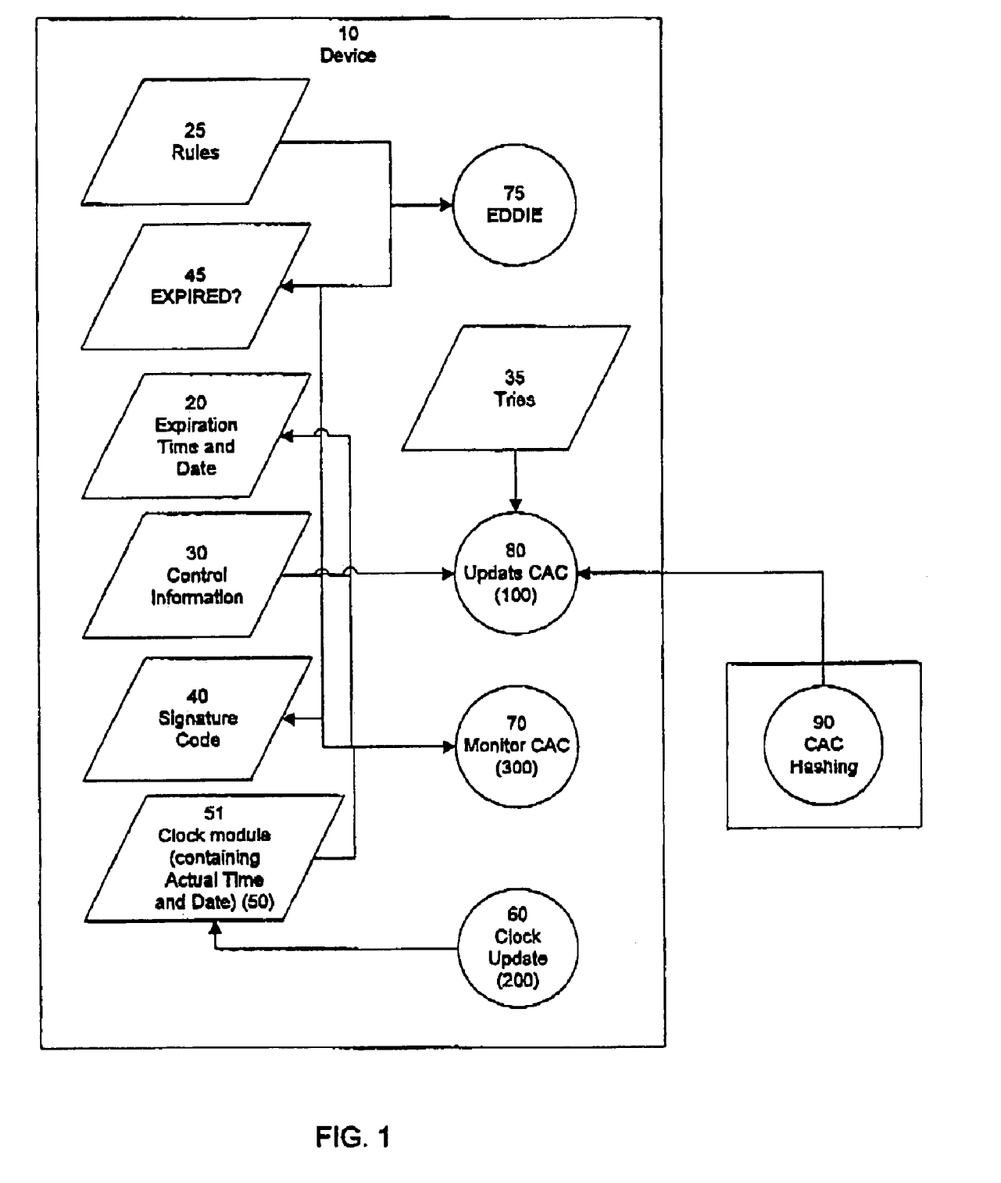
FIG. 1 is a block diagram of an overview of conditioning access to the remotely-accessible device according to the invention.

Referring initially to FIG. 1 of the drawings, in which like numerals indicate like elements throughout the several views, an overview of the conditioning access parameters on the remotely-accessible device is displayed. Remotely-accessible device 10 contains means to review and monitor an expiration time and date 20, control information 30, a signature code 40, rules 25, expired status 45, and an actual time and date 50 within the clock module 51. These parameters are evaluated by a monitoring process 70, later described in more detail in FIG. 4. These parameters can be updated by an updating process 80, later described in more detail in FIG. 2. The updating process 80 also contains tamper protection means whereby the system will inhibit any further code processing after a certain number of attempts or tries 35 to update the expiration time and date 20 are exceeded. The actual time and date 50 is obtained from a receiver which updates the clock module 51 by a clock updating process 60. Preferably the receiver is a global positioning system receiver, but the receiver may also be an automatic clock receiver, a digital television carrier receiver, or a U.S. Naval Observatory network time protocol (NTP) client receiver. The receiver and the process 60 of updating the clock will be described in more detail in FIG. 3. The remotely-accessible device 10 also contains an application function called Event Driven Dynamic Interface Engine (EDDIE) 75, which controls the information sent and received from the device. Also provided in the overview of the remotely-accessible device 10 is a hashing device 90, which safeguards the signature generation algorithm. The processes performed by the remotely-accessible device and the signals of the device may be referred to herein as the "system".

In the preferred embodiment, the remotely-accessible device 10 will be preprogrammed by a service provider with an expiration time and date 20. The preprogrammed expiration time and date 20 is programmed into the remotely-accessible device 10 directly by the service provider using a command, direct connect or an over-the-air transmission. This command may be directly sent to the remotely-accessible device 10 by any source, including short message system, e-mail, TCP/IP, circuit switched data call, serial direct connect, conventional or trunked radio, GPRS, 1XRTT and DTMF/AMPS. The preprogrammed expiration time and date 20 may be entered upon a successful signature code 40 logon sequence. The signature code 40 represents the combination of control information 30 and the expiration time and date 20. The control information 30 is made up of various confidential elements including a unique seed loaded in the factory. This signature code 40 is necessary to validate and therefore maintain the function of the device. The hashing device 90 contains the master keys to the signature code 40 and only through a properly initialized hashing device 90 is it possible to generate a valid signature code 40 for any given remotely-accessible device 10.

Figure 5:
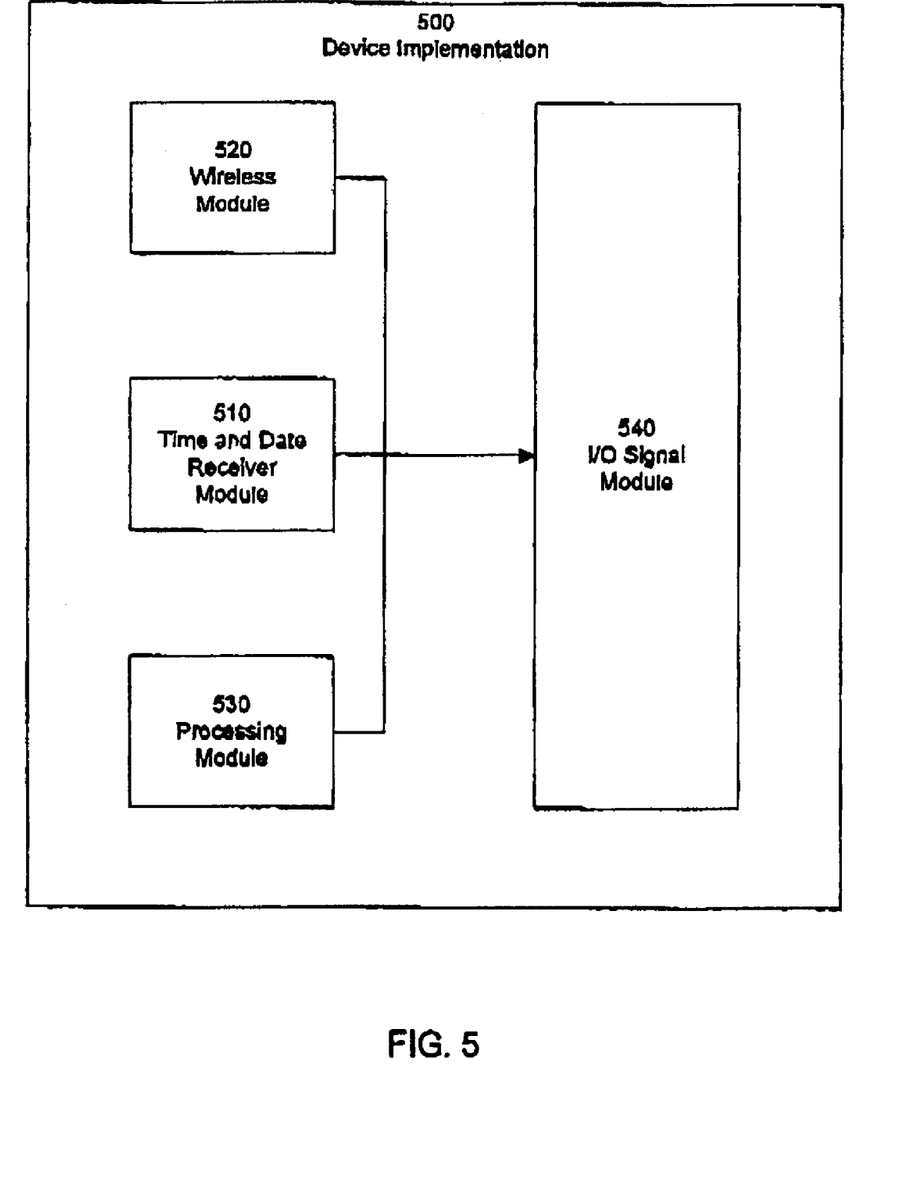
FIG. 5 is a block diagram of the remotely-accessible device during implementation.

Referring now to FIG. 1 and FIG. 5, in combination, the remotely-accessible device 10 also contains a wireless module 520, which provides for relatively inexpensive communications between the service provider and the remotely-accessible device 10. The wireless module 520 can use a cellular network, satellite, wireless internet services, or other wireless forms of communication. The remotely-accessible device also contains an application function that is an Event Driven Dynamic Interface Engine (EDDIE) 75 that is capable of controlling an object, such as a vehicle or equipment, and generating reports using user input rules 25 and actions. The rules 25 and actions determine what information will be reported to the user, what actions may be taken at the object being tracked and what messages will be sent or logged by the system. The rules 25 and actions can be sent and received by the wireless module 520 in the remotely-accessible device 10. Before the user may input rules 25 and actions, the user must enter a password or a conditioned access code. The application function EDDIE 75 can be configured directly attached or by over-the-air transmission. The user of the remotely-accessible device 10 may input rules 25 and actions from any source such as, short message service, e-mail, TCP/IP, circuit switched data call, serial direct connection, conventional or trunked radio, GPRS, 1XRTT and DTMF/AMPS. The user then configures the rules 25 based upon several criteria, some of them being the tracked object's position, speed, time, signals, communications mode and status. The user then can configure actions that will be activated when the rules 25 are met, such as, controlling signals or sending and logging messages. The tracking reports, status information, controlling the object, or whatever information the user has configured the system to output can be available to the user on a website, printed report, or other form of transmission. For example, the user may input a rule 25 of "car over 85 m.p.h." and an action of "alert the driver of car and the manager of the fleet". Then, when a car in the user's fleet goes over 85 m.p.h., the driver will be alerted as well as the manager of the fleet. Additionally, the user may control objects directly by an over-the-air transmission.

The following is a list of some of the possible rules 25 that the user may input into the application function which will trigger actions saved in the EDDIE application function 75 location, speed, heading or direction, time of day, day of the week, stop condition, range of a geo-fence, polygon geo-fence, route adherence, ignition sense, global position system status, temperature, revolutions per minute, several other external digital sensors, and antenna and communication status. The following is a list of some of the possible actions that the user may input into the EDDIE application function 75 which will be activated upon the occurrence of the above rules 25 send or receive short message service/e-mail message; circuit switched data message or callback; toggle control switched output; panic mode priority; toggle power mode; counter controls may be reset, incremented, enabled or disabled; set up voice call; terminate call; cease operation of tracked object; disable ignition switch of object; or reconfigure system parameters. The following is a list of some of the possible reports available to the user: global position system position, location or velocity fix; global position system time and distance; communications module status; network condition; input status; odometer; counter values; event, operator, geo-zone, and counter messages; selective log retrieval by date time range and message identifier; last checkpoint log retrieval; and selective log output to terminal or high speed call path.

Figure 3:
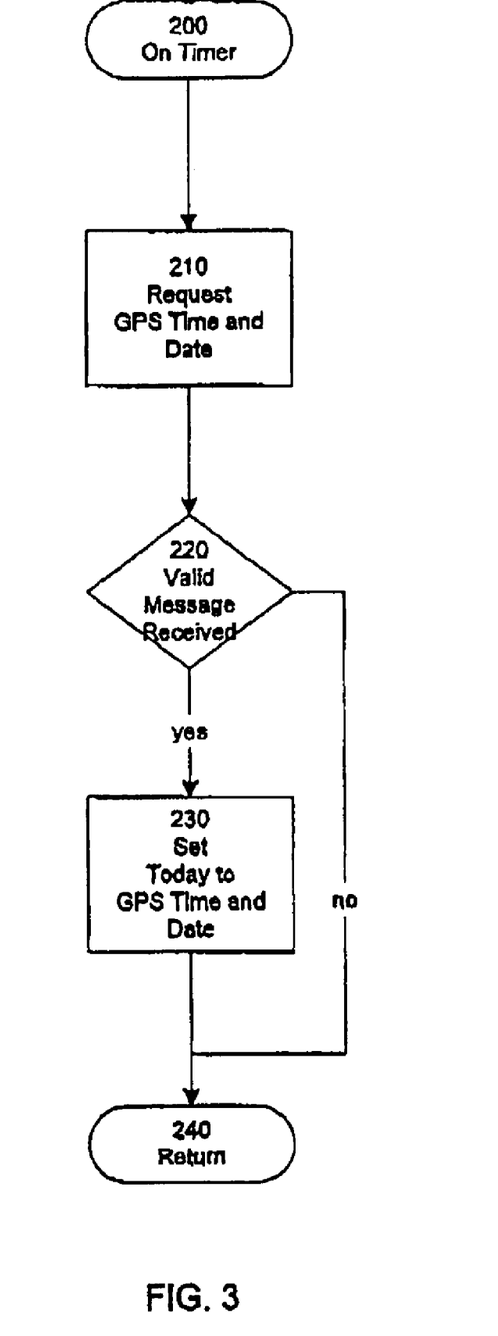
FIG. 3 is a flow diagram of the process of updating the actual time and date in a remotely-accessible system with conditioned access according to the invention.

The remotely-accessible device 10 also contains a receiving module 510, which receives an actual time and date 50 processed by a clock update step 60, preferably by a global positioning system receiver. Referring to FIG. 1 and FIG. 3 in combination, the clock module 51 internal to the remotely-accessible device 10 operates on regular intervals to update the actual time and date 50 in the remotely-accessible device 10 by a clock update process 60. A timer 200 in the clock module 51 is set to automatically send and receive a signal from and to the time and date receiver module 510 at regular intervals. In the preferred embodiment, the global positioning system is used and the timer 200 sends a signal requesting the global positioning systems' accurate time and date 210. The signal received is validated 220 and if it is a valid actual time and date 50, the clock module 51 resets the actual time and date 230. If the signal received is not a valid actual time and date, the reset function 230 is bypassed and the clock module 51 is not updated. The system then returns to normal operation 240.

Figure 4:
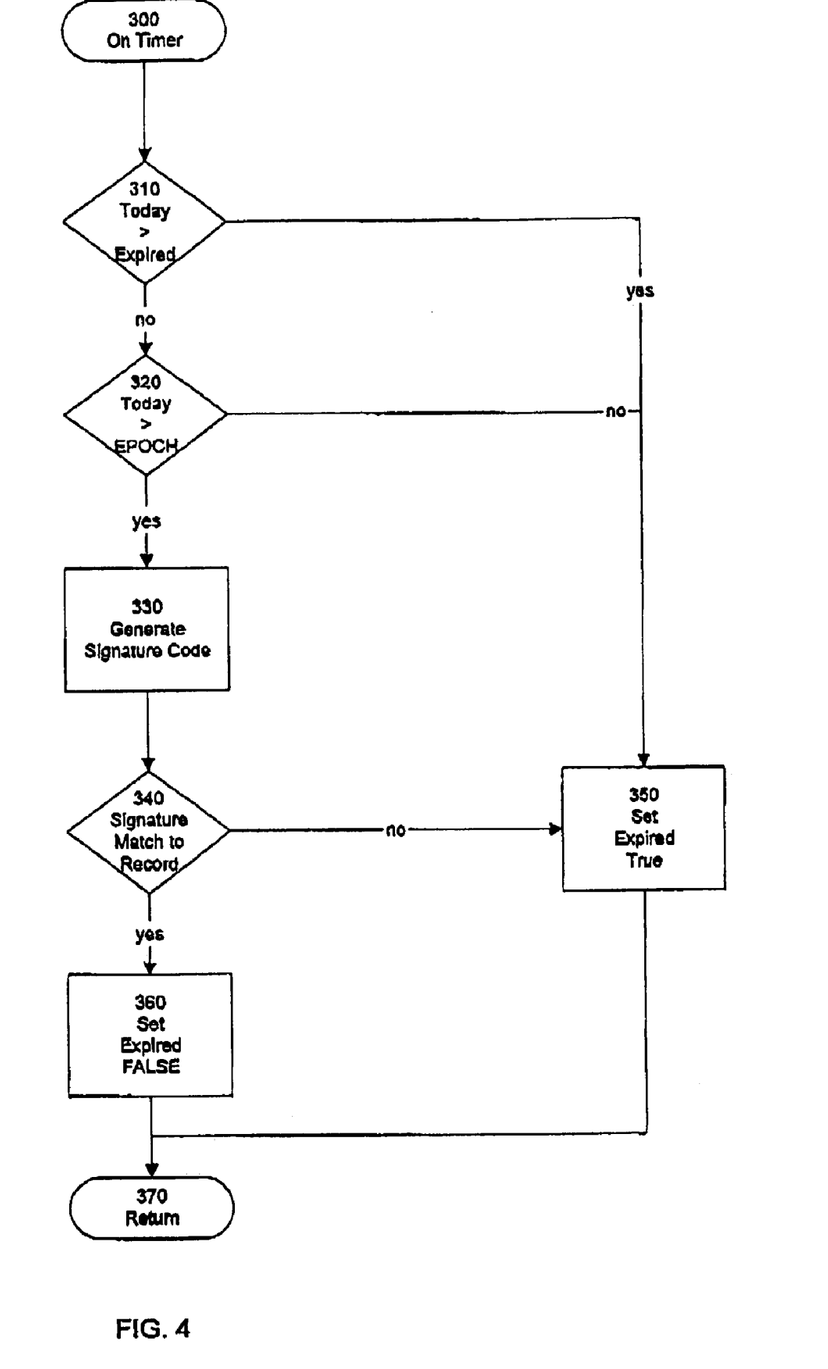
FIG. 4 is a flow diagram of the process of monitoring the actual time and date and the preprogrammed expiration time and date according to the invention.

Referring now to FIG. 1, FIG. 4 and FIG. 5 in combination, the monitoring process 70, internal to the remotely-accessible device 10, operates on regular intervals to compare the actual time and date 50 with the preprogrammed expiration time and date 20. A timer 300 within the monitoring process 70 is set to automatically activate the monitoring process 70 at regular intervals. A processing module 530 within the monitoring process 70 compares the actual time and date 50 with a preprogrammed expiration time and date 20 by a comparison process 310. If the actual time and date 50 is greater than the preprogrammed expiration time and date 20, then the system is set to be expired 45 by step 350 and return to the system by step 370 whereby the processing of signals of the device will be disabled. If the actual time and date 50 is less then the preprogrammed expiration time and date 20, then the system will move on to compare the actual time and date 50 with the EPOCH in step 320. EPOCH is a fixed date inside the remotely-accessible device 10 which is used as a detection tool to determine when the clock module 51 is invalid. The clock module 51 is deemed invalid when the clock module's 51 actual time and date 50 is less than the EPOCH. If the actual time and date 50 is not greater than the EPOCH, then the system is set to be expired by step 350 and return to the system by step 370 whereby the processing of signals of the device will be disabled. If the actual time and date 50 is greater then the EPOCH, then the system will move on to generate a signature code 40. The monitoring process 70 will generate a signature code by step 330, using control information 30, which is made up of various elements including a unique seed loaded in the factory, and the expiration time and date 20. The signature code 40 is then matched up to the record signature code in a comparison process 340. If the signature codes match, the monitoring process 70 sets the system to not be expired by step 360 and returns to the system by step 370 whereby the remotely-accessible device continues to operate normally. Specifically, the expired status 45 will read false, or not expired, and the EDDIE application function 75 will continue to operate within the processing module 530 by processing signals according to the rules 25 and continuing to output action signals by the I/O signal module 540.

Figure 2:
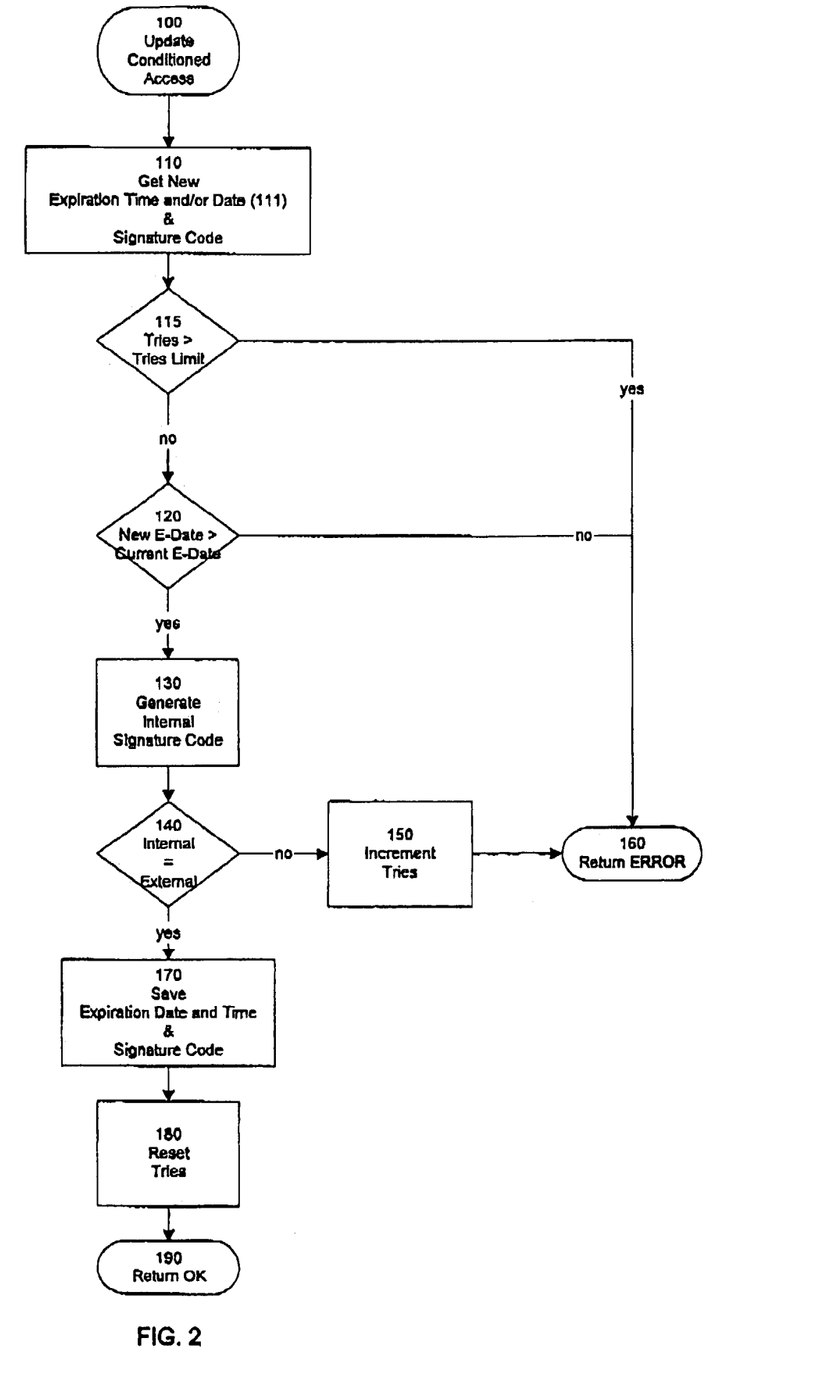
FIG. 2 is a flow diagram of the process of updating the expiration time and date in a remotely-accessible system with conditioned access according to the invention.

Also provided is an updating process 80 for updating the preprogrammed expiration time and date 20 in the conditioned access remotely-accessible device 10. Referring to FIG. 1 and FIG. 2 in combination, the updating process 80, internal to the remotely-accessible device 10, operates upon the service provider's command. To update an existing preprogrammed expiration time and date 20 with a new expiration time and date 111, the service provider will need to enter the update conditioned access system shown in step 100. Then the service provider will enter the new expiration time and date 111 into the remotely-accessible device 10 directly by using a command, direct connect or an over-the-air transmission. This command may be directly sent to the remotely-accessible device 10 by any source, including short message system, e-mail, TCP/IP, circuit switched data call, serial direct connect, conventional or trunked radio, GPRS, 1XRTT and DTMF/AMPS. The service provider will also need to input a signature code 40 made up of control information 30 and an expiration time and date 20. Control information 30 is made up of various elements including a unique seed loaded in the factory. This signature code 40 is necessary to validate and maintain function of the device. The remotely-accessible device 10 then compares the number of attempted tries 35 with the limit of attempted tries allowed in process 115. If the number of tries 35 to update the system is greater than the tries limit, the system will return an error message by step 160 and the device will cease processing signals. If the number of tries 35 is less than the limit of attempted tries, the system will continue on and compare expiration dates. Upon inputting the new expiration time and date 111 and a signature code 40 into the system by step 110, the system will compare the new expiration time and date 111 with the preprogrammed expiration time and date 20 in a comparison process 120. If the new expiration time and date 111 occurs prior to the existing preprogrammed expiration time and date 20, then the system will return an error notification by step 160. If the new expiration time and date 111 occurs after the existing preprogrammed expiration time and date 20, then the system will move on to generate an internal signature code in process 130.

After comparing the expiration times or dates, the updating process 80 will generate an internal signature code by process 130. Again, this signature code will contain control information 30 and the expiration time and date 20. The control information 30 is made up of various elements including a unique seed loaded in the factory. The internal signature code is then compared to the external signature code in a comparison process 140. If the internal and external signature codes are identical, the updating process 80 saves the new expiration time and date 111 and the signature code in a saving process 170. Then the system uses the new expiration time and date 111 as the preprogrammed expiration date or time 20. If the signature codes do not match up, the system will incrementally repeat trying the code in process 150 and eventually return an error message by step 160. By the incrementing tries 35, the remotely-accessible device 10 is protected against tampering because process 150 will inhibit any further code processing upon exceeding a fixed number of tries 35. This protects against the user attempting to guess the signature code 40 by playing with the unit. Once the new expiration time and date 111 is saved, the system resets tries by step 180 and returns a system message as okay in process 190. The tries 35 are reset in step 180 so that approved tries 35 are not counted against attempted tries 35 that could eventually disable the system. Only failed access tries 35 are cumulatively calculated in the increment tries process 150.

Accordingly, it will be understood that the preferred embodiment of the present invention has been disclosed by way of example and that other modifications and alterations may occur to those skilled in the art without departing from the scope and spirit of the appended claims. Those skilled in the art will understand that this invention could be used in any device that tracks or monitors any object.

For example, conditioning access to a remotely-accessible device is equally applicable in both the telematic and telemetry fields. For example, in the telemetry field, the invention could be used to monitor and regulate cable television and air conditioning. The invention could also be used to monitor and operate objects, such as, vending machines, trailer tracking, utility meter reading, residential and commercial alarms, vehicle fleet tracking, stolen vehicle recovery, point of sale operations, automated teller machines and rental equipment, such as heavy machinery. Essentially, conditioning access to a remotely-accessible device can be used in any operation where there is remote asset management.

What is claimed is:

1. A method for updating a preprogrammed expiration time and date in a remotely-accessible device controlled by conditioning access comprising:
   inputting a new expiration time and date and an external signature code into said remotely-accessible device;
   comparing said new expiration time and date with said preprogrammed expiration time and date;
   generating an internal signature code if said new expiration time and date is greater than said preprogrammed expiration time and date;
   comparing said internal signature code with said external signature code;
   saving said new expiration time and date and said internal signature code of said internal signature code is the same as said external signature code; and
   resetting said preprogrammed expiration time and date to said new expiration time and date.

2. The method of claim 1, wherein said preprogrammed expiration time and date and said new expiration time and date represent an expiration time and date of a license agreement for tracking and monitoring services.

3. The method of claim 1, wherein said preprogrammed expiration time and date and said new expiration time and date represent an expiration time and date of a lease agreement for equipment.

4. The method of claim 1, wherein said preprogrammed expiration time and date and said new expiration time and date represent or an expiration time and date of a metering agreement.

5. The method of claim 1, wherein said new expiration time and date represents a renewed agreement.

6. The method of claim 1, wherein said new expiration time and date is input into the remotely-accessible device directly.

7. The method of claim 1, wherein said remotely-accessible device determines a plurality of parameters of an object.

8. The method of claim 1, wherein said remotely-accessible device may be used to track and monitor objects.

9. The method of claim 8, wherein said objects are vehicles for a stolen vehicle recovery system.

10. The method of claim 8, wherein said objects comprise a fleet of vehicles.

11. The method of claim 8, wherein said objects comprise leased equipment.

12. The method of claim 8, wherein said objects comprise meters.

13. The method of claim 1, wherein said remotely-accessible device may be used to control objects.

14. The method of claim 1, wherein said remotely-accessible device further comprises an internal logic wherein said internal logic monitors said preprogrammed expiration time and date, a validity of a signature and said actual time and date upon regular intervals.

15. The method, according to claim 1, wherein said method further comprises the step of denying access to said remotely-accessible device by disabling the process of signals of said remotely-accessible device if said actual time and date occur after said pre-programmed expiration time and date.

16. A remotely-accessible device comprising:
   a wireless module;
   an application function to control an object and generate reports;
   a receiver module for determining an actual time and date based upon signals received at said receiver supplying reliable time information;
   a process module for comparing said actual time and date with a preprogrammed expiration time and date and permitting access to said remotely-accessible device if said actual time and date occurs prior to said preprogrammed expiration time and date; and
   an input/output signal module whereby access may be denied to said remotely-accessible device by disabling the processing of signals of said remotely-accessible device if said actual time and date occurs after said preprogrammed expiration time and date wherein said application function is an Event Driven Dynamic Interface Engine (EDDIE) application that controls said object and generates reports according to user input rules and actions.

17. The remotely-accessible device of claim 16, wherein said receiver is a global positioning system receiver.

18. The remotely-accessible device of claim 16, wherein said preprogrammed expiration time and date represent an expiration time and date of a license agreement for tracking and monitoring services.

19. The remotely-accessible device of claim 16, wherein said preprogrammed expiration time and date represent an expiration time and date of a lease agreement for equipment.

20. The remotely-accessible device of claim 16, wherein said preprogrammed expiration time and date represent an expiration time and ate of a metering agreement.

21. The remotely-accessible device of claim 16, wherein said preprogrammed expiration time and date is input into said remotely-accessible device directly.

22. The remotely-accessible device claim of 16, wherein said user must input a password before gaining access to said remotely-accessible device and inputting said rules and actions.

23. The remotely-accessible device of claim 16, wherein said user configures said application function based parameters of said object.

24. The remotely-accessible device of claim 16, wherein said user configures said application function actions.

25. The remotely-accessible device of claim 16, wherein said remotely-accessible device determines a plurality of parameters of said object.

26. The method of claim 16, wherein said remotely-accessible device may be used to track and monitor said objects.

27. The method of claim 26, wherein said objects are vehicles for a stolen vehicle recovery system.

28. The method of claim 26, wherein said objects comprise a fleet of vehicles.

29. The method of claim 26, wherein said objects comprise leased equipment.

30. The method of claim 26, wherein said objects comprise meters.

31. The method of claim 16, wherein said remotely-accessible device may be used to control said objects.

32. The remotely-accessible device of claim 16, wherein said remotely-accessible device further comprises an internal logic wherein said internal logic monitors said preprogrammed expiration time and date, a validity of a signature and said actual time and date upon regular intervals.

* * * * *

UNITED STATES PATENT AND TRADEMARK OFFICE
CERTIFICATE OF CORRECTION

PATENT NO. : 7,170,390 B2 Page 1 of 1
APPLICATION NO. : 10/368496
DATED : January 30, 2007
INVENTOR(S) : Luis F. Quinones and Victor Maldonado It is certified that error appears in the above-identified patent and that said Letters Patent is hereby corrected as shown below:

Column 1,
Line 24, "functionality o service," should read --functionality of the device if the user's license, service--.
Line 42, "where the en re-route" should read --where the end user of a device finds ways to re-route--.

Column 2,
Line 25, "user's right" should read --user's rights to use the decive.--.

Column 6,
Line 60, "rules 25 send" should read --rules 25: send--.

Column 9,
Line 38, "code of said" should read --code if said--.
Line 52, "represent or an" should read --represent an--.

Column 10,
Line 52, "time and ate of" should read --time and date of--.

Signed and Sealed this

Seventh Day of August, 2007

JON W. DUDAS
*Director of the United States Patent and Trademark Office*